United States Patent
Macias et al.

(10) Patent No.: US 9,042,901 B2
(45) Date of Patent: May 26, 2015

(54) DYNAMIC SMALL CELL PROVISIONING AND FREQUENCY TUNING

(71) Applicants: Verizon Patent and Licensing Inc., Basking Ridge, NJ (US); Cellco Partnership, Basking Ridge, NJ (US)

(72) Inventors: John F. Macias, Antelope, CA (US); Donna L. Polehn, Kirkland, WA (US); Lalit R. Kotecha, San Ramon, CA (US); Patricia R. Chang, San Ramon, CA (US); Deepak Kakadia, Antioch, CA (US); Priscilla Lau, Fremont, CA (US); Yee Sin Chan, San Jose, CA (US); David Chiang, Fremont, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 37 days.

(21) Appl. No.: 14/064,939

(22) Filed: Oct. 28, 2013

(65) Prior Publication Data

US 2015/0119047 A1 Apr. 30, 2015

(51) Int. Cl.
*H04W 36/00* (2009.01)
*H04W 36/22* (2009.01)
*H04W 52/02* (2009.01)

(52) U.S. Cl.
CPC .......... *H04W 36/22* (2013.01); *H04W 52/0206* (2013.01)

(58) Field of Classification Search
CPC ...................................................... H04W 36/00
USPC .................................... 455/436–444; 370/331
See application file for complete search history.

(56) References Cited

U.S. PATENT DOCUMENTS

| | | | |
|---|---|---|---|
| 2009/0252073 A1* | 10/2009 | Kim et al. ...................... | 370/311 |
| 2011/0128916 A1* | 6/2011 | Kwon et al. .................. | 370/328 |
| 2011/0190022 A1* | 8/2011 | Rudrapatna ................... | 455/522 |
| 2012/0263145 A1* | 10/2012 | Marinier et al. .............. | 370/331 |
| 2013/0077482 A1* | 3/2013 | Krishna et al. ................ | 370/230 |
| 2013/0084873 A1* | 4/2013 | Sharony et al. ............... | 455/438 |
| 2013/0184031 A1* | 7/2013 | Pollington et al. .......... | 455/556.1 |
| 2013/0322235 A1* | 12/2013 | Khoryaev et al. ............. | 370/229 |
| 2014/0031047 A1* | 1/2014 | Jovanovic et al. ............ | 455/446 |
| 2014/0247811 A1* | 9/2014 | Singh et al. ................... | 370/332 |
| 2014/0341182 A1* | 11/2014 | Gage et al. .................... | 370/331 |

* cited by examiner

*Primary Examiner* — Charles Shedrick

(57) ABSTRACT

A system may include a macro cell base station configured to determine a service quality associated with the macro cell base station; determine whether the service quality is below a quality threshold; and instruct a small cell base station to switch from a sleep mode to an awake mode, when the service quality is below the quality threshold. The system may further include a small cell base station, located within a coverage area of the macro cell base station, configured to enter an awake mode, when instructed to enter the awake mode by the macro cell base station; and inform the macro cell base station that the small cell base station is in awake mode. The macro cell base station may be further configured to hand over one or more user devices to the small cell base station, when the small cell base station is in the awake mode.

20 Claims, 11 Drawing Sheets

DYNAMIC SMALL CELL PROVISIONING AND FREQUENCY TUNING

BACKGROUND INFORMATION

Mobile communication devices connect to an access network via a base station. A base station may include a radio frequency (RF) transceiver configured to receive wireless signals from a mobile communication device and to transmit wireless signals to the mobile communication device. A base station may communicate with a large number of mobile communication devices. The large number of mobile communication devices may tax the resources of the base station.

DETAILED DESCRIPTION OF PREFERRED EMBODIMENTS

The following detailed description refers to the accompanying drawings. The same reference numbers in different drawings identify the same or similar elements.

Figure 1A:
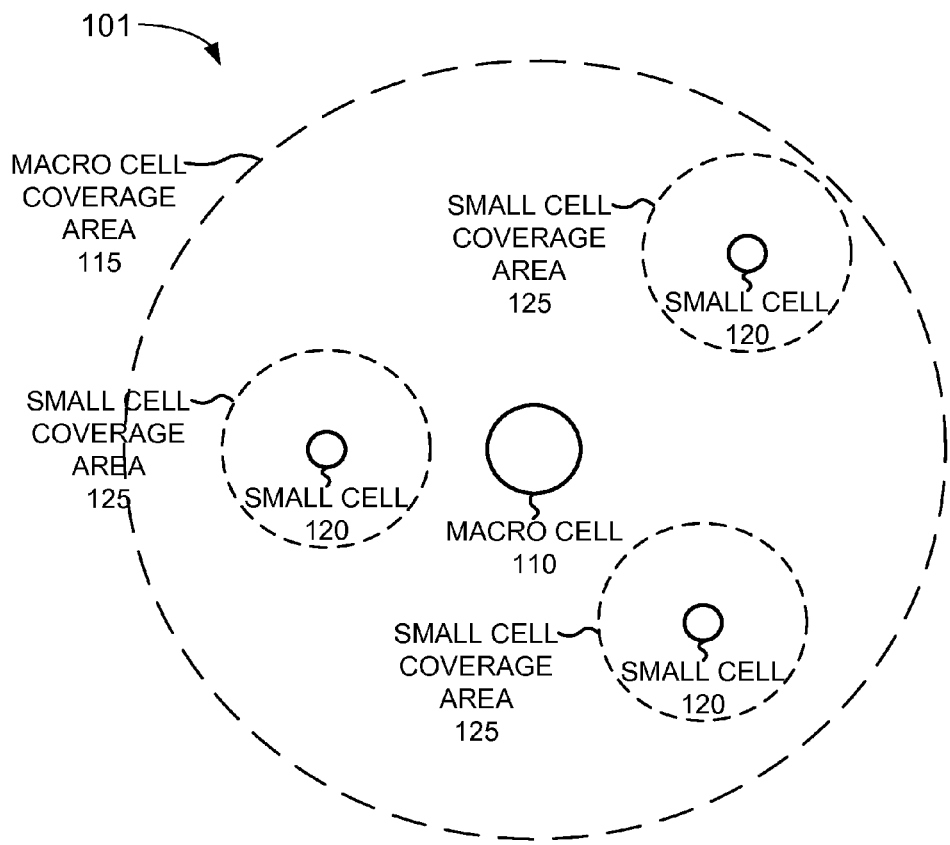
FIG. 1A is a diagram illustrating an exemplary coverage area of a base station according to an implementation described herein.

Implementations described herein relate to dynamic small cell provisioning and frequency tuning. FIG. 1A is a diagram illustrating an exemplary coverage area 101 of a base station according to an implementation described herein. As shown in FIG. 1A, coverage area 101 may include a macro cell base station 110 (referred to herein as "macro cell 110") with a macro cell coverage area 115 and one or more small cell base stations 120 (referred to herein collectively as "small cells 120" and individually as "small cell 120") with corresponding small cell coverage areas 125.

Macro cell 110 may correspond to a base station, such as a Long Term Evolution (LTE) eNodeB. Macro cell 110 may enable user equipment devices, such as mobile communication devices, located within macro cell coverage area 115, to communicate with macro cell 110 via wireless signals. Small cell 120 may correspond to a base station, such as an LTE eNodeB, which is configured to offload excess capacity from macro cell 110. Small cell 120 may be associated with a smaller radio frequency (RF) transceiver and/or antenna assembly than macro cell 110 and/or may be configured to operate at lower power than macro cell 110. Thus, small cell 120 may have small cell coverage area 125, which is smaller than macro cell coverage area 115. While small cell coverage area 125 is shown in FIG. 1A as being within macro cell coverage area 115, small cell coverage area 125 need not be wholly within macro cell coverage area 115, but may instead partially overlap macro cell coverage area 115. Additionally or alternatively, small cell 120 may be configured to operate at a reduced capacity and/or resources with respect to macro cell 110. Furthermore, while 3 small cells 120 are shown in macro cell coverage area 115 for illustrative purposes, macro cell 110 may be associated with a different number of small cells 120.

Figure 1B:
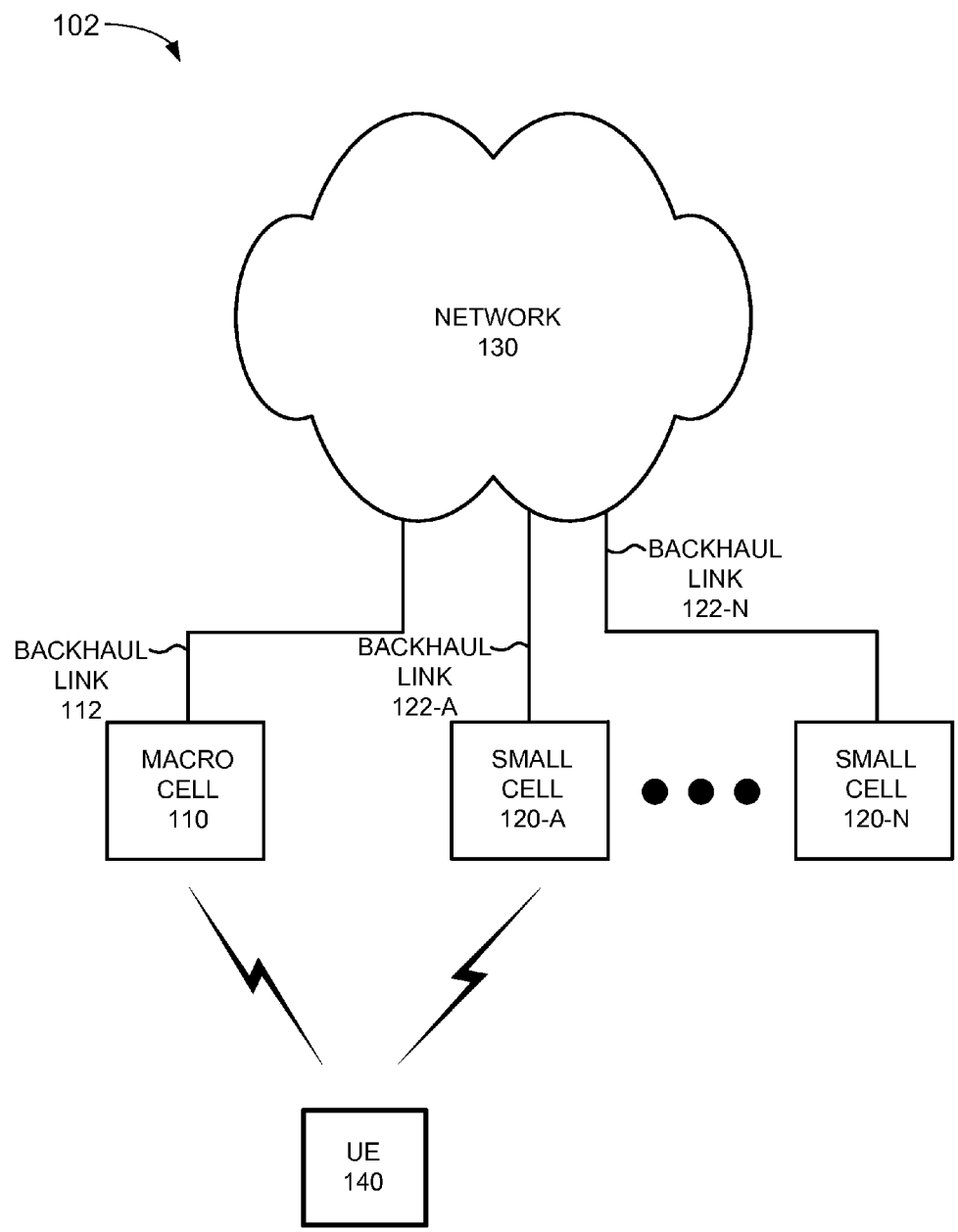
FIG. 1B is a diagram illustrating an exemplary environment according to an implementation described herein.

FIG. 1B is a diagram illustrating an exemplary environment 102 associated with coverage area 101 of FIG. 1A. As shown in FIG. 1B, environment 102 may include a user equipment (UE) device 140 (referred to herein as "UE 140"), macro cell 110, small cells 120-A to 120-N, and network 130.

Mobile communication device 140 may include any mobile communication device configured to communicate with a base station via wireless signals. For example, mobile communication device 140 may include a portable communication device (e.g., a mobile phone, a smart phone, a phablet device, a global positioning system (GPS) device, and/or another type of wireless device); a telephone terminal; a personal computer or workstation; a server device; a laptop, tablet, or another type of portable computer; a media playing device; a portable gaming system; and/or any type of mobile device with wireless communication capability.

Macro cell 110 may connect to network 130 via backhaul link 112. Small cells 120-A to 120-N may connect to network 130 via backhaul links 122-A to 122-N, respectively. Network 130 may enable macro cell 110 and small cells 120 to communicate with each other via backhaul links 112 and 122. Network 130 may include one or more circuit-switched networks and/or packet-switched networks. For example, network 130 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

Although FIGS. 1A and 1B show exemplary components of coverage area 101 and environment 102, in other implementations, coverage area 101 and/or environment 102 may include fewer components, different components, differently arranged components, or additional components than depicted in FIG. 1A or 1B. Additionally or alternatively, one or more components of coverage area 101 and/or environment 102 may perform functions described as being performed by one or more other components of coverage area 101 and/or environment 102.

Small cells 120 may be installed in locations within macro cell coverage area 115 that experience intermittent increases in user traffic. Examples of such locations include traffic intersections, shopping malls, stadiums, office buildings, convention centers, performance venues, toll roads, and/or other types of locations that may experience increases in user traffic. An increase in user traffic within macro cell coverage area 115 may tax the resources of macro cell 110. Macro cell 110 may dynamically provision small cells 120 to offload excess capacity during periods of heavy traffic.

If macro cell 110 is able to handle user traffic while maintaining a particular service quality, small cell 120 may remain in a sleep mode (e.g., operating at a reduced power, in an idle mode, with a reduced number of active processors, etc.). Macro cell 110 may monitor service quality associated with macro cell 110. For example, macro cell 110 may monitor an RF link quality associated with macro cell 110, may monitor a number of users associated with macro cell 110 (e.g., the number of UEs 140 attached to macro cell 110), may monitor carrier load ratios associated with macro cell 110, may monitor resources in reserve associated with macro cell 110, and/or may monitor other factors that determine service quality for macro cell 110. Macro cell 110 may determine a service quality score based on the monitored factors and, if the service quality is below a quality threshold, may instruct small cell 120 to enter an awake mode. After small cell 120 enters an awake mode, macro cell 110 may hand over a particular number or percentage of UEs 140 to small cell 120, i.e., macro cell 110 may hand over responsibility for communicating with a particular number or percentage of UEs 140 to small cell 120.

Small cell 120 may remain in the awake mode until instructed by macro cell 110 to resume sleep mode. Macro cell 110 may instruct small cell 120 to enter the sleep mode if the number of users within small cell coverage area 125 drops to below a user number threshold, if the service quality associated with small cell 120 drops below a small cell quality threshold, based on historical data, and/or based on other factors.

Furthermore, when macro cell 110 dynamically provisions small cell 120, by instructing small cell 120 to enter the awake mode, macro cell 110 may perform frequency tuning with respect to small cell 120. Macro cell 110 and small cell 120 may be configured to operate in multiple frequency bands, such as different LTE frequency bands. Macro cell 110 may inform small cell 120 about which frequency band macro cell 110 is using and may instruct small cell 120 to select a different frequency band. Thus, macro cell 110 and small cell 120 may use different frequency bands. Using different frequency bands may result in a better service quality, as the capacity of a particular frequency band is less likely to be used up.

Small cell 120 may monitor the service quality associated with small cell 120 and may provide information about the small cell service quality to macro cell 110. If macro cell 110 determines that the small cell service quality is high (e.g., above a small cell service quality threshold), macro cell 110 may provide an incentive to UEs 140 within small cell coverage area 125 to attach to small cell 120 rather than to macro cell 110. As an example, macro cell 110 may reduce power, resulting in UEs 140 to observe that small cell 120 is providing a stronger signal and to select to attach to small cell 120. As another example, macro cell 110 may introduce a bias into small cell 120 by instructing small cell 120 to increase power. As yet another example, macro cell 110 may generate a signal instructing UEs 140 in small cell coverage area 125 to attach to small cell 120.

Figure 2:
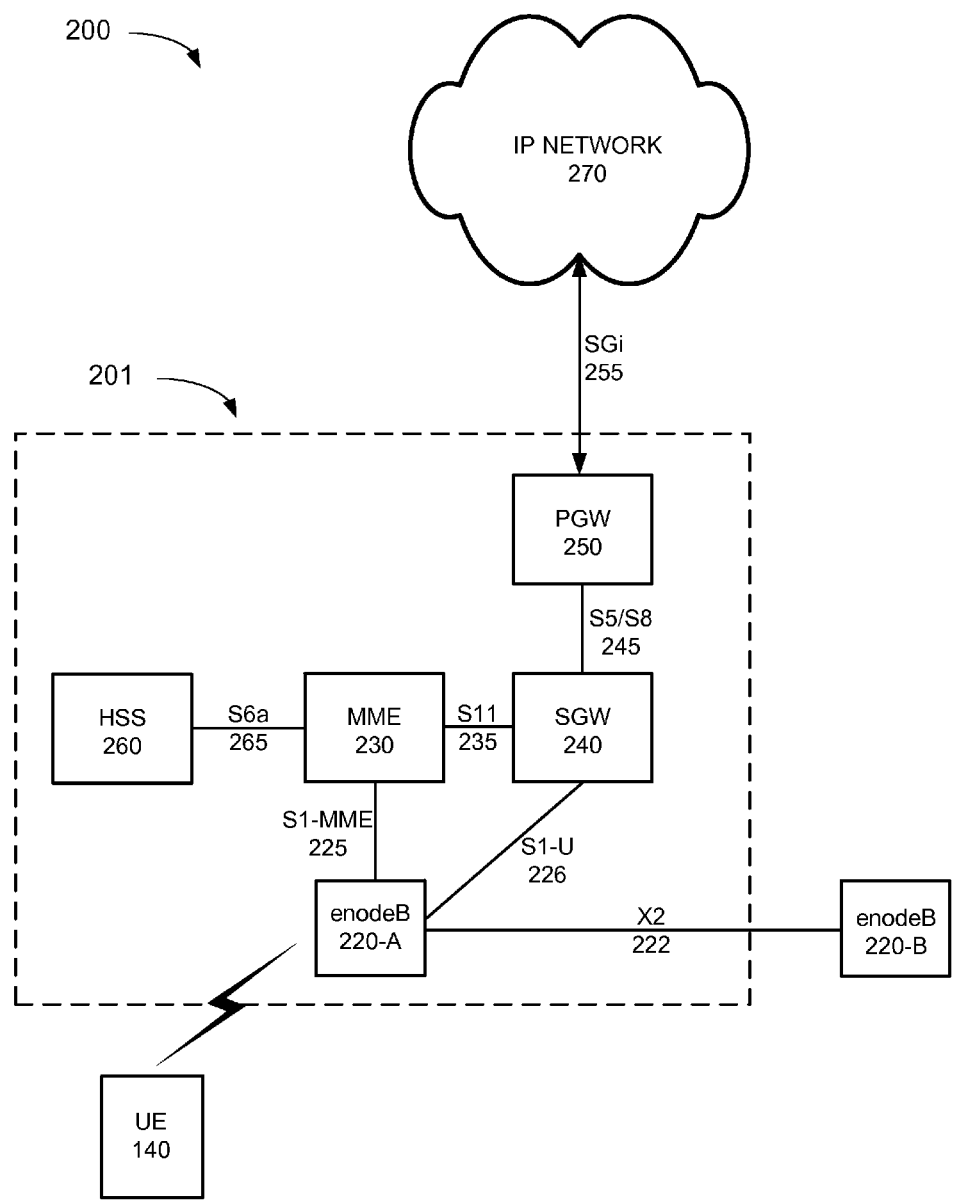
FIG. 2 is a diagram illustrating an exemplary access network according to an implementation described herein.

FIG. 2 is a diagram illustrating example components of a system 200 according to an implementation described herein. As shown in FIG. 2, system 200 may include UE 140, an access network 201, and an Internet Protocol (IP) network 270. Access network 201 may be associated with macro cell 110 and/or one or more small cells 120. Access network 201 may correspond to a Long Term Evolution (LTE) access network. Access network 201 may include one or more devices that implement logical entities interconnected via standardized interfaces, and that provide wireless packet-switched services and wireless IP connectivity to user devices for both data and voice services. Access network 201 may include an eNodeB 220, a mobility management entity (MME) device 230, a serving gateway (SGW) device 240, a packet data network gateway (PGW) device 250, and a home subscriber server (HSS) device 260. While FIG. 2 depicts a single UE 140, eNodeB 220, MME device 230, SGW 240, PGW 250, HSS device 260, and external IP network 270 for illustration purposes, in other implementations FIG. 2 may include multiple UEs 140, eNodeBs 220, MME devices 230, SGWs 240, PGWs 250, HSS devices 260, and/or external IP networks 270.

eNodeB 220 may include one or more devices (e.g., base stations) and other components and functionality that allow UE 140 to wirelessly connect to access network 201. eNodeB 220 may interface with access network 201 via a S1 interface, which may be split into a control plane S1-MME interface 225 and a data place S1-U interface 226. S1-MME interface 225 may interface with MME device 230. S1-MME interface 225 may be implemented, for example, with a protocol stack that includes a Network Access Server (NAS) protocol and/or Stream Control Transmission Protocol (SCTP). S1-U interface 226 may interface with SGW 240 and may be implemented, for example, using a General Packet Radio Service Tunneling Protocol version 2 (GTPv2). eNodeB 220-A may communicate with eNodeB 220-B via an X2 interface 222. X2 interface 222 may be implemented, for example, with a protocol stack that includes an X2 application protocol and SCTP.

MME device 230 may implement control plane processing for access network 201. For example, MME device 230 may implement tracking and paging procedures for UE 140, may activate and deactivate bearers for UE 140, may authenticate a user of UE 140, and may interface to non-LTE radio access networks. A bearer may represent a logical channel with particular quality of service (QoS) requirements. MME device 230 may also select a particular SGW 240 for a particular UE 140. A particular MME device 230 may interface with other MME devices 230 in access network 201 and may send and receive information associated with UEs, which may allow one MME device to take over control plane processing of UEs serviced by another MME device, if the other MME device becomes unavailable.

SGW 240 may provide an access point to and from UE 140, may handle forwarding of data packets for UE 140, and may act as a local anchor point during handover procedures between eNodeBs 220. SGW 240 may interface with PGW 250 through an S5/S8 interface 245. S5/S8 interface 245 may be implemented, for example, using GTPv2.

PGW 250 may function as a gateway to IP network 270 through an SGi interface 155. IP network 270 may include, for example, an IP Multimedia Subsystem (IMS) network, which may provide voice and multimedia services to UE 140, based on Session Initiation Protocol (SIP). A particular UE 140, while connected to a single SGW 240, may be connected to multiple PGWs 250, one for each packet network with which UE 140 communicates.

MME device 230 may communicate with SGW 240 through an S11 interface 235. S11 interface 235 may be implemented, for example, using GTPv2. S11 interface 235 may be used to create and manage a new session for a particular UE 140. S11 interface 235 may be activated when MME device 230 needs to communicate with SGW 240, such as when the particular UE 140 attaches to access network 201, when bearers need to be added or modified for an existing session for the particular UE 140, when a connection to a new PGW 250 needs to created, or during a handover procedure (e.g., when the particular UE 140 needs to switch to a different SGW 240).

HSS device 260 may store information associated with UEs 140 and/or information associated with users of UEs 140. For example, HSS device 260 may store user profiles that include authentication and access authorization information. MME device 230 may communicate with HSS device 260 through an S6a interface 265. S6a interface 265 may be implemented, for example, using a Diameter protocol.

Although FIG. 2 shows exemplary components of system 200, in other implementations, system 200 may include fewer components, different components, differently arranged components, or additional components than depicted in FIG. 2. Additionally or alternatively, one or more components of system 200 may perform functions described as being performed by one or more other components of system 200.

Figure 3:
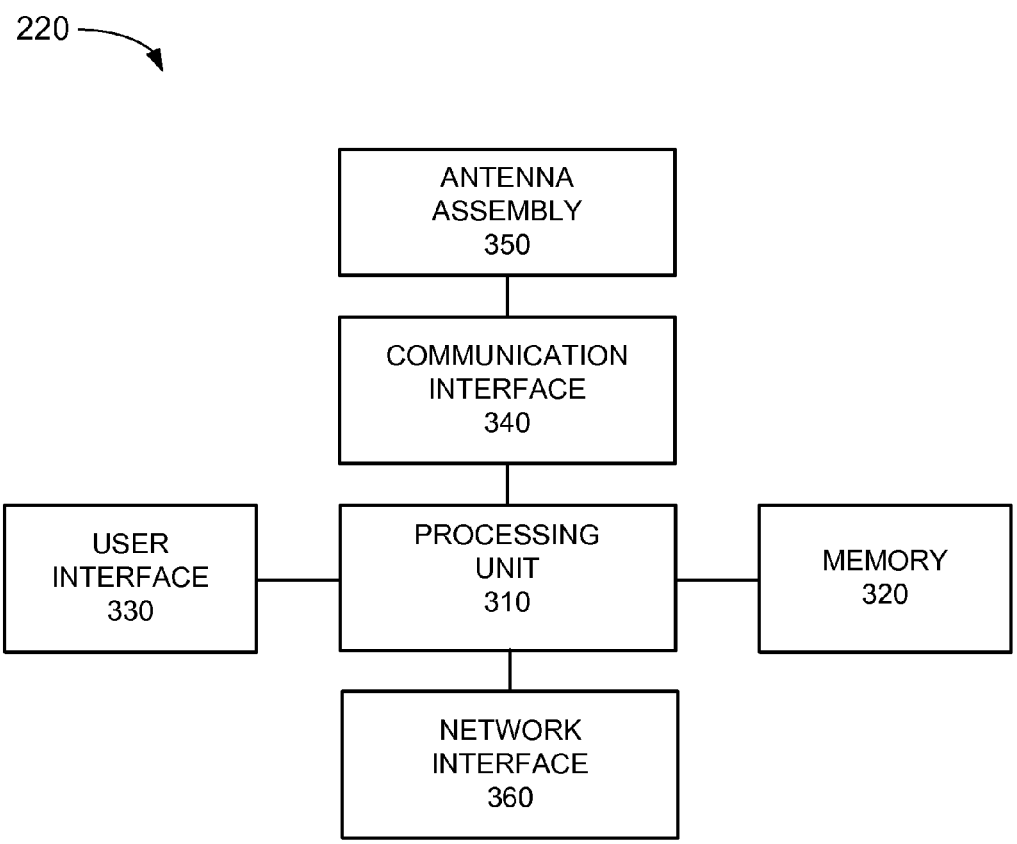
FIG. 3 is a diagram illustrating exemplary components of an eNodeB of FIG. 2.

FIG. 3 is a diagram illustrating example components of eNodeB 220 according to an implementation described herein. As shown in FIG. 3, eNodeB 220 may include a processing unit 310, a memory 320, a user interface 330, a communication interface 340, an antenna assembly 350, and a network interface 360.

Processing unit 310 may include one or more processors, microprocessors, application specific integrated circuits (ASICs), field programmable gate arrays (FPGAs), and/or other processing logic. Processing unit 310 may control operation of eNodeB 220 and its components.

Memory 320 may include a random access memory (RAM) or another type of dynamic storage device, a read only memory (ROM) or another type of static storage device, a removable memory card, and/or another type of memory to store data and instructions that may be used by processing unit 310.

User interface 330 may include mechanisms for inputting information to eNodeB 220 and/or for outputting information from eNodeB 220. Examples of input and output mechanisms might include a speaker to receive electrical signals and output audio signals; a microphone to receive audio signals and output electrical signals; buttons (e.g., a joystick, control buttons, a keyboard, or keys of a keypad) and/or a touchscreen to permit data and control commands to be input into eNodeB 220; a display, such as an LCD, to output visual information; and/or any other type of input or output device. In some embodiments, eNodeB 220 may be managed remotely and may not include user interface 330. In other words, eNodeB 220 may be "headless" and may not include an input device and/or an output device.

Communication interface 340 may include one or more RF transceivers that enable eNodeB 220 to communicate with UEs 140 via wireless communications. An RF transceiver may include an RF transmitter that receives signals to be transmitted wirelessly and performs signal processing on the signals before providing the signals to antenna assembly 350, and an RF receiver that receives signals from antenna assembly 350 and performs signal processing on the received signals before providing the received signals to processing unit 310. For example, the RF transceiver may perform analog-to-digital and digital-to-analog conversion, modulation and demodulation, up-conversion and down-conversion, and/or amplification of signals.

Antenna assembly 350 may include one or more antennas to transmit and/or receive RF signals over the air. Antenna assembly 350 may, for example, receive RF signals from communication interface 340 and transmit the signals over the air and receive RF signals over the air and provide them to communication interface 340.

Network interface 360 may include a logical component that includes input and/or output ports, input and/or output systems, and/or other input and output components that facilitate the transmission of data to other devices via a backhaul link. For example, network interface 360 may include a network interface card (e.g., Ethernet card) for wired communications and/or a wireless network interface (e.g., a WiFi) card for wireless communications. Network interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As described herein, eNodeB 220 may perform certain operations in response to processing unit 310 executing software instructions contained in a computer-readable medium, such as memory 320. A computer-readable medium may be defined as a non-transitory memory device. A non-transitory memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 3 shows example components of eNodeB 220, in other implementations, eNodeB 220 may include fewer components, different components, differently arranged components, or additional components than those depicted in FIG. 3. Additionally or alternatively, one or more components of eNodeB 220 may perform the tasks described as being performed by one or more other components of eNodeB 220.

Figure 4:
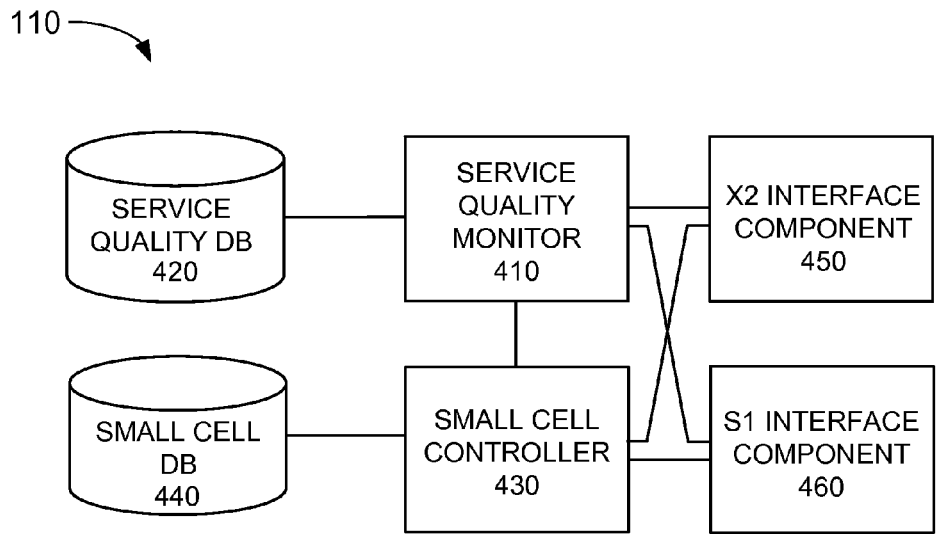
FIG. 4 is a diagram illustrating exemplary functional components of a macro cell of FIGS. 1A and 1B.

FIG. 4 is a diagram illustrating exemplary functional components of macro cell 110 according to a first implementation described herein. The functional components of macro cell 110 may be implemented, for example, via processing unit 310 executing instructions from memory 320. Alternatively, some or all of the functional components of macro cell 110 may be implemented via hard-wired circuitry. As shown in FIG. 4, macro cell 110 may include a service quality monitor 410, a service quality database (DB) 420, a small cell controller 430, a small cell DB 440, an X2 interface component 450, and an S1 interface component 460.

Service quality monitor 410 may monitor a service quality associated with macro cell 110. For example, service quality monitor 410 may determine a service quality score for macro cell 110 based on an RF link quality, based on a number of users associated with macro cell 110, based on load ratios associated with macro cell 110, and/or based on resources in reserve associated with macro cell 110.

Service quality DB 420 may store service quality information determined by service quality monitor 410. Exemplary information that may be stored in service quality DB 420 is described below with reference to FIG. 6A.

Small cell controller 430 may control small cells 120 associated with macro cell 110. For example, small cell controller 430 may instruct a small cell 120 to enter an awake mode or to resume a sleep mode based on quality service factors. Furthermore, small cell controller 430 may instruct small cell 120 not to use a particular frequency band or may instruct small cell 120 to use a particular frequency band. Moreover, small cell controller 430 may inform small cell 120 as to how many UEs 140 are to be handed over, which may enable small cell 120 to allocate resources required for the hand overs.

Additionally, small cell controller 430 may receive small cell service quality data from small cell 120 and may select to provide an incentive to UEs 140 to attach to small cell 120 if the service quality associated with small cell 120 is higher than a quality threshold.

Small cell DB 440 may store information relating to small cells 120 associated with macro cell 110. Exemplary information that may be stored in small cell DB 440 is described below with reference to FIG. 6B.

X2 interface component 450 may implement an X2 interface with another eNodeB 220, such as macro cell 110 and/or small cell 120. S1 interface component 460 may implement an S1 interface with MME 230. If macro cell 110 and small cell 120 are associated with different MMEs 230, a hand over may be performed over an S1 interface.

Although FIG. 4 shows exemplary functional components of macro cell 110, in other implementations, macro cell 110 may include fewer functional components, different functional components, differently arranged functional components, or additional functional components than depicted in FIG. 4. Additionally or alternatively, one or more functional components of macro cell 110 may perform functions described as being performed by one or more other functional components of macro cell 110.

Figure 5:
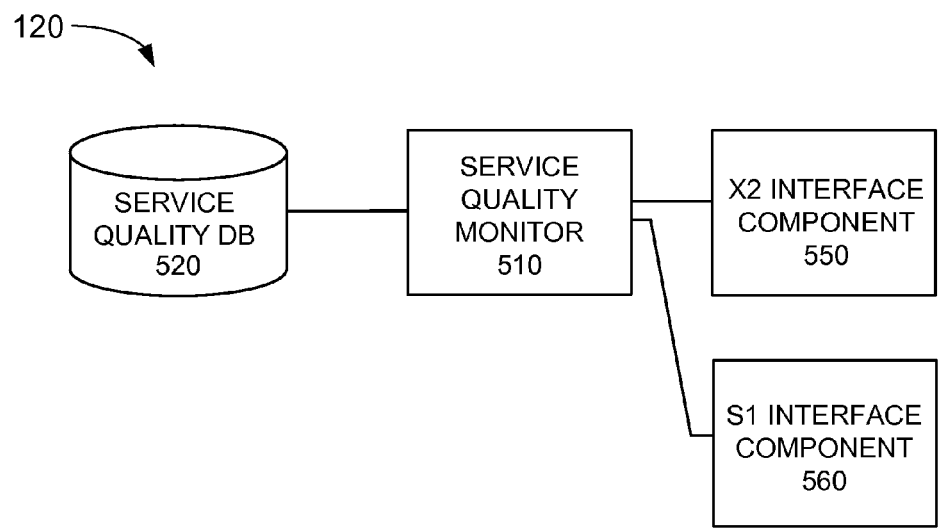
FIG. 5 is a diagram illustrating exemplary functional components of a small cell of FIGS. 1A and 1B.

FIG. 5 is a diagram illustrating exemplary functional components of small cell 120 according to a first implementation described herein. The functional components of small cell 120 may be implemented, for example, via processing unit 310 executing instructions from memory 320. Alternatively, some or all of the functional components of small cell 120 may be implemented via hard-wired circuitry. As shown in FIG. 5, small cell 120 may include a service quality monitor 510, a service quality DB 520, an X2 interface component 550, and an S1 interface component 560.

Service quality monitor 510 may monitor a service quality associated with small cell 120. For example, service quality monitor 510 may determine a service quality score small cell 120 based on an RF link quality, based on a number of users associated with small cell 120, based on load ratios associated with small cell 120, and/or based on resources in reserve associated with small cell 120. Service quality monitor 510 may provide the determined small cell service quality to macro cell 110.

Service quality DB 520 may store service quality information determined by service quality monitor 510. Exemplary information that may be stored in service quality DB 520 is described below with reference to FIG. 6A.

X2 interface component 550 may implement an X2 interface with another eNodeB 220, such as macro cell 110 and/or small cell 120. S1 interface component 560 may implement an S1 interface with MME 230. If macro cell 110 and small cell 120 are associated with different MMEs 230, a hand over may be performed over an S1 interface.

Although FIG. 5 shows exemplary functional components of small cell 120, in other implementations, small cell 120 may include fewer functional components, different functional components, differently arranged functional components, or additional functional components than depicted in FIG. 5. Additionally or alternatively, one or more functional components of small cell 120 may perform functions described as being performed by one or more other functional components of small cell 120.

Figure 6A:
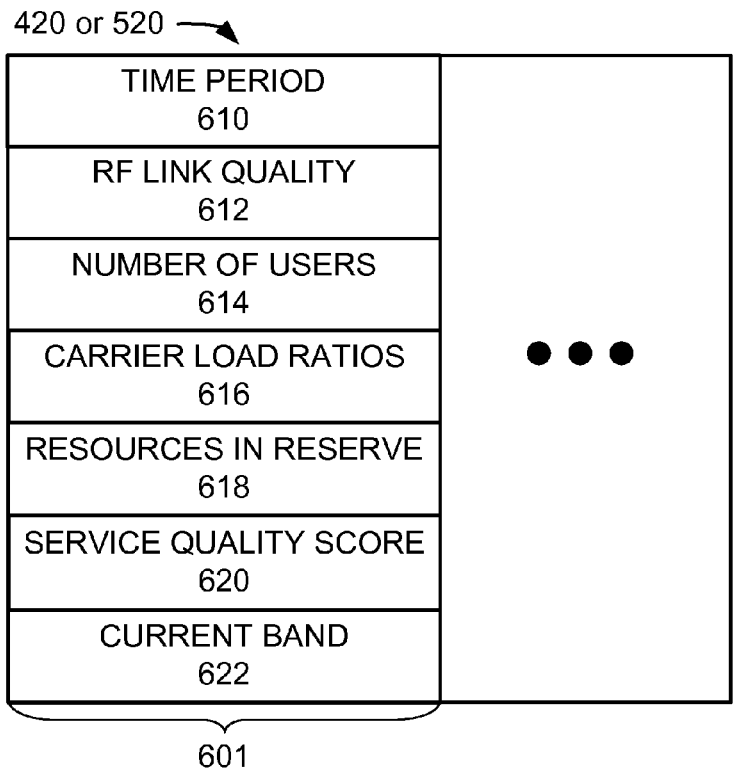
FIG. 6A is a diagram of exemplary components of a service quality database of FIGS. 4 and 5.

FIG. 6A is a diagram of exemplary components of service quality database 420 or 520. As shown in FIG. 6A, service quality database 420 or 520 may include one or more service quality entries 601. Each service quality entry 601 may store information relating to service quality measured during a particular time period. Each service quality entry 601 may include a time period field 610, an RF link quality field 612, a number of users field 614, a carrier load ratios field 616, a resources in reserve field 618, a service quality score field 620, and a current band field 622.

Time period field 610 may identify the particular time period during which the information stored in service quality entry 601 was obtained. RF link quality field 612 may store information relating to a measured RF link quality during the particular time period. For example, RF link quality field 612 may store information relating to a measured throughput, a selected modulation scheme, a measured signal strength value, a measured signal to noise ratio, and/or another value indicative of RF signal quality. Number of users field 614 may store information relating to the number of users associated with macro cell 110 (or with small cell 120 in service quality DB 520). For example, number of users field 614 may store information identifying a number of attached UEs 140, a total number of active sessions, a number of sessions of a particular type (e.g., voice, data, streaming video, etc.), and/or another measure of a number of users.

Carrier load ratios field 616 may store information identifying one or more load ratios associated with macro cell 110 (or with small cell 120 in service quality DB 520). For example, carrier load ratios field 616 may store a ratio of the number of users of a particular Quality of Service (QoS) to a total number of users, may store a ratio of the number of users of a particular QoS to a total capacity of number of users of the particular QoS, and/or may store another type of carrier load ratio.

Resources in reserve field 618 may store information relating to the quantity of resources in reserve for macro cell 110 (or small cell 120 in service quality DB 520). For example, resources in reserve field 618 may store information relating to what percentage of total capacity is available for a particular measure of capacity, such as bandwidth, number of users, processor computing time, memory, and/or another measure of capacity.

Service quality score field 620 may store a service quality score computed based on information stored in an RF link quality field 612, number of users field 614, carrier load ratios field 616, and/or resources in reserve field 618. The service quality score may be computed based on a weighted average of the stored information.

Current band 622 may store information identifying a current frequency band being used by macro cell 110 (or by small cell 120 in service quality DB 520). For example, current band 622 may identify a particular LTE band, such as any of Evolved Universal Terrestrial Radio Access (E-UTRA) bands 1 through 44 (e.g., the Advanced Wireless Services (AWS) band, the 700C band, the Personal Communications Service (PCS) band, the Cellular 850 band, etc.).

Although FIG. 6A shows example components of RF link quality database of 420, in other implementations, RF link quality database of 420 may include fewer components, different components, differently arranged components, or additional components than those depicted in FIG. 6A.

Figure 6B:
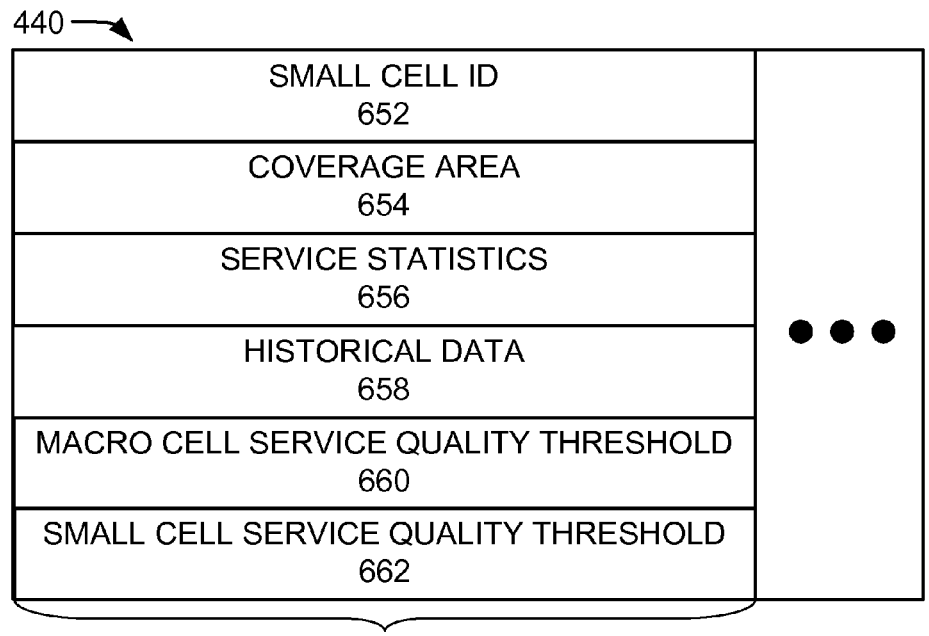
FIG. 6B is a diagram of exemplary components of a small cell database of FIG. 4.

FIG. 6B is a diagram of exemplary components of small cell DB 440. As shown in FIG. 6B, small cell DB 440 may include one or more small cell records 651. Each small cell record 651 may store information relating to a particular small cell 120 associated with macro cell 110 (e.g., within macro cell coverage area 115). Small cell record 651 may include a small cell ID field 652, a coverage area field 654, a service statistics field 656, a historical data field 658, a macro cell service quality threshold field 660, and a small cell service quality threshold field 662.

Small cell ID field 652 may store an identifier associated with a particular small cell 120. Furthermore, small cell ID field 652 may include information that may be used by macro cell 110 to communicate with small cell 120 using an X2 interface and/or to communicate with an MME 230 associated with small cell 120 over an S1 interface. Coverage area field 654 may include information identifying small cell coverage area 125. For example, coverage area field 654 may store a range of GPS coordinates associated with small cell coverage area 125. The coverage area information may be used to determine which UEs 140 to hand over from macro cell 110 to small cell 120.

Service statistics field 656 may store service quality statistics associated with the particular small cell 120. For example, service statistics field 656 may store information obtained from service quality DB 520 of the particular small cell 120. The service quality statistics information may be used to determine whether the particular small cell 120 is experiencing a high service quality (e.g., higher than a service quality threshold), which may be used by macro cell 110 to select to provide an incentive for UEs 140 to attach to the particular small cell 120.

Historical data field 658 may store historical data associated with the particular small cell 120. For example, historical data field 658 may store information relating to how many users were associated with the particular small cell 120 during a particular time period, service quality statistics associated with the particular small cell 120 during the particular time period, etc. The historical data may be used by macro cell 110 to select to pre-emptively wake up the particular small cell 120 during particular time periods. For example, if the historical data indicates a high number of users during a particular time of day, macro cell 110 may select to instruct the particular small cell 120 to enter an awake state as the particular time of day approaches.

Macro cell service quality threshold field 660 may store a macro cell service quality threshold. The macro cell service quality threshold may be used to determine whether to instruct the particular small cell 120 to enter an awake mode. Small cell service quality threshold field 662 may store a small cell service quality threshold. The small cell service quality threshold may be used to determine whether the service quality associated with the particular small cell 120 is high.

Although FIG. 6B shows example components of small cell database 440, in other implementations, small cell database 440 may include fewer components, different components, differently arranged components, or additional components than depicted in FIG. 6B.

Figure 7:
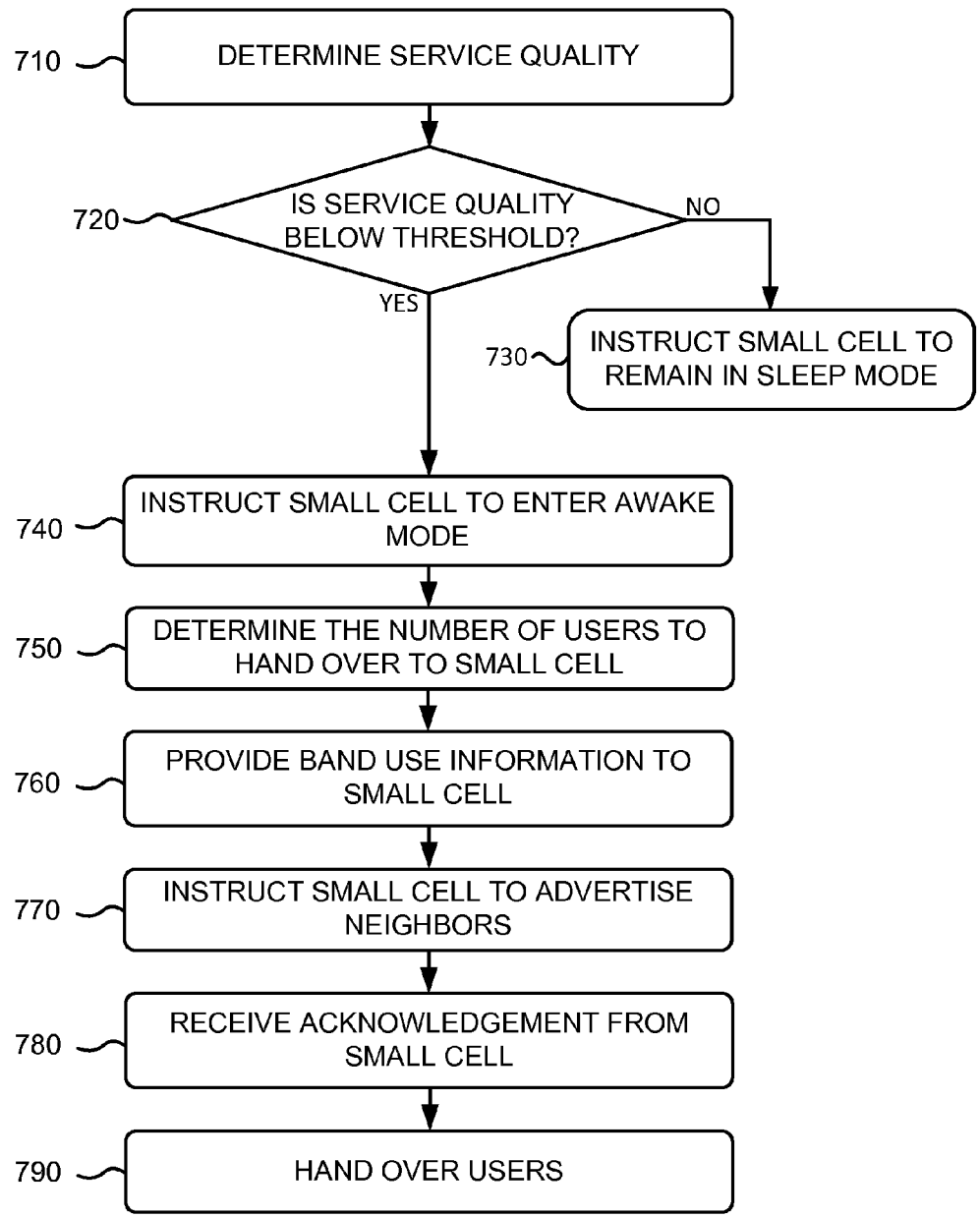
FIG. 7 is a first flowchart of dynamic small cell provisioning according to an implementation described herein.

FIG. 7 is a first flowchart of dynamic small cell provisioning according to an implementation described herein. In one implementation, the process of FIG. 7 may be performed by macro cell 110. In other implementations, some or all of the process of FIG. 7 may be performed by another device or a group of devices separate from and/or including macro cell 110.

The process of FIG. 7 may include determining service quality (block 710). For example, service quality monitor 410 may determine one or more service quality factors for macro cell 110 and may determine a service quality score. A process for determining the service quality score is described in more detail below with reference to FIG. 8.

A determination may be made as to whether the service quality is below a threshold (block 720). For example, service quality monitor 410 may determine a service quality score stored in service quality DB 420 associated with the most recent time period and may determine whether the service quality score is below a macro cell service quality threshold (e.g., stored in macro cell service quality threshold field 660). The service quality threshold may be based on empirical data, a particular service quality guaranteed for particular types of users (e.g., a particular guaranteed throughput, bitrate, etc.), and/or based on other criteria.

If it is determined that the service quality is not below the threshold (block 720—NO), a small cell may be instructed to remain in sleep mode (block 730). As an example, macro cell 110 may instruct small cell 120 to remain in sleep mode. As another example, if small cell 120 is already in a sleep mode, macro cell 110 may take no action.

Returning to block 720, if it is determined that the service quality is below the threshold (block 720—YES), a small cell may be instructed to enter an awake mode (block 740). For example, small cell controller 430 of macro cell 110 may instruct small cell 120 to enter an awake mode. In some implementations, if macro cell 110 is associated with multiple small cells 120, macro cell 110 may select a particular small cell 120 based on, for example, a coverage area associated with the particular small cell 120. For example, macro cell 110 may determine an area associated with a high concentration of UEs 140 attached to macro cell 110 and identify a particular small cell 110 with small cell coverage area 115 that includes all or most of the area with the high concentration of UEs 140.

In some implementations, if macro cell 110 is associated with multiple small cells 120, macro cell 110 may select to wake up multiple small cells 120 based on the distribution of UEs 140 in macro cell coverage area 115. For example, macro cell 110 may identify a first cluster of UEs 140 in a first area associated with a first small cell 120 and a second cluster of UEs 140 in a second area associated with a second small cell 120. Macro cell 110 may wake up the first small cell 120 and select to hand over the first cluster of UEs 140 to the first small cell 120 and may wake up the second small cell 120 and select to hand over the second cluster of UEs 140 to the second small cell 120.

If macro cell 110 and a particular small cell 120 are associated with a same MME 230, macro cell 110 may send the instructions to the particular small cell 120 over X2 interface 222. If macro cell 110 and the particular small cell 120 are associated with different MMEs 230, macro cell 110 may send the instructions to the particular small cell 120 via MME 230 over S1 interface 225.

A number of users to hand over to the small cell may be determined (block 750). In some implementations, small cell controller 430 may estimate how many UEs 140 to hand over to small cell 120 to increase the service quality to above the service quality threshold. In other implementations, small cell controller 430 may select to hand over a block of UEs 140, which includes a particular number of UEs 140, and may continue to hand over blocks of UEs 140 until the service quality is sufficiently improved (e.g., the service quality score rises above the service quality threshold).

Band use information may be provided to the small cell (block 750). For example, macro cell 110 may determine the currently used frequency band (e.g., based on information stored in current band field 622) and may provide information identifying the currently used frequency band to small cell 110 along with an instruction to small cell 110 to select a different band. Thus, macro cell 110 and small cell 120 may end up using different frequency bands, which may enable both macro cell 110 and small cell 120 to accommodate a larger number of users on each frequency band. In some implementations, if macro cell 110 is associated with multiple small cells 120, macro cell 110 may instruct each small cell 120 to select a different frequency band by, for example, selecting a different frequency band for each small cell 120. In other implementations, since small cell coverage areas 125 may not overlap, multiple small cells 120 may end up using the same frequency band.

The small cell may be instructed to advertise neighbors (block 770). For example, macro cell 110 may instruct small cell 120 to advertise its neighboring base station after small cell 120 wakes up. If small cell 120 advertises its neighbors, which may include other small cells 120 in the area, UEs 140 may be able identify other base stations in the area and may be able to select a particular base station for attachment based on one or more criteria, such as signal strength.

An acknowledgement may be received from the small cell (block 780) and users may be handed over (block 790). For example, once small cell 120 enters the awake mode, small cell 120 may send an acknowledgement to macro cell 120 that small cell 120 is awake and macro cell 110 may begin to hand over UEs 140 to small cell 120. If macro cell 110 and a particular small cell 120 are associated with a same MME 230, macro cell 110 may perform the hand overs using X2 interface 222. If macro cell 110 and the particular small cell 120 are associated with different MMEs 230, macro cell 110 may perform the hand overs via MME 230 using S1 interface 225.

In some implementations macro cell 110 may, after handing over a particular number of users, determine whether service quality has increased to above the service quality threshold. If the service quality has not increased to above the service quality threshold, macro cell 110 may continue to hand over UEs 140 to small cell 120.

Small cell 120 may remain in awake mode until macro cell 110 instructs small cell 120 to resume sleep mode. Macro cell 110 may instruct small cell 110 to enter the sleep mode if the number of UEs 140 in small cell coverage area 115 drops below a particular user threshold, if service quality associated with small cell 120 drops below a small cell service quality threshold, if the service quality associated with macro cell 110 increased to above a particular service quality threshold, and/or based on another factor. For example, macro cell 110 may use historical data associated with small cell 110 to determine when to instruct small cell 120 to enter the awake mode and when to instruct small cell 120 to enter a sleep mode. For example, if small cell 120 is located in a shopping mall that closes at 9 PM macro cell 110 may determine, based on accumulated historical data associated with small cell 120, that small cell 120 should be instructed to enter the sleep mode after 9 PM.

Figure 8:
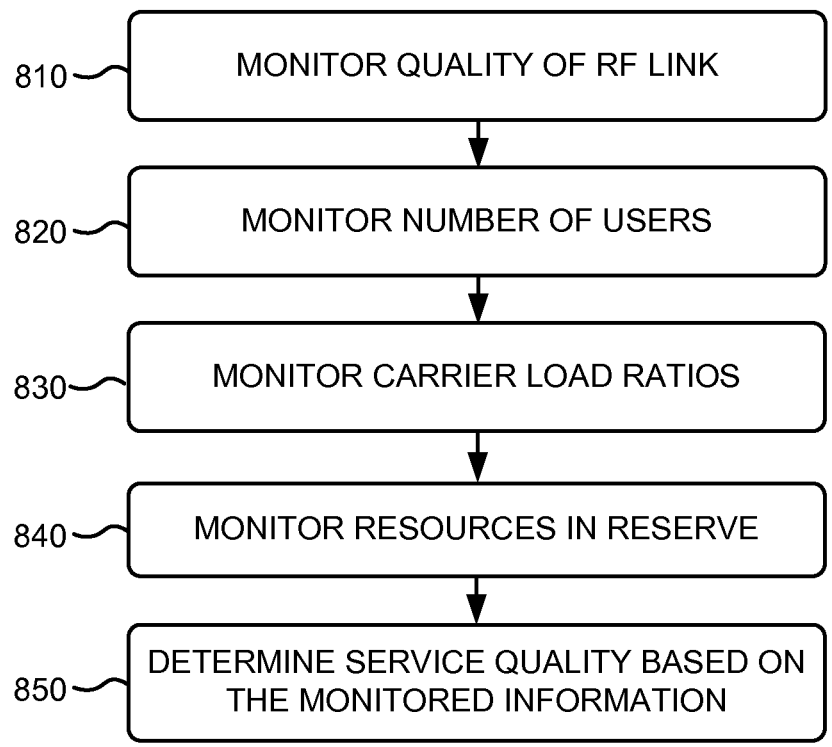
FIG. 8 is a flowchart of monitoring service quality according to an implementation described herein.

FIG. 8 is a flowchart of monitoring service quality according to an implementation described herein. In one implementation, the process of FIG. 8 may be performed by macro cell 110. In other implementations, some or all of the process of FIG. 8 may be performed by another device or a group of devices separate from and/or including macro cell 110, such as small cell 120.

The process of FIG. 8 may include monitoring the quality of an RF link (block 810). For example, service quality monitor 410 may monitor the RF link quality associated with small cell 120. As another example, service quality monitor 510 may monitor the RF link quality associated with macro cell 110. RF link quality may be determined based on one or more of a measured throughput, a selected modulation scheme, a measured signal strength value, a measured signal to noise ratio, and/or another value indicative of RF signal quality.

The number of users may be monitored (block 820). For example, service quality monitor 410 may monitor the number of users associated with macro cell 110. As another example, service quality monitor 510 may monitor the number of users associated with small cell 120. The number of users may be based on a number of attached UEs 140, a total number of active sessions, a number of sessions of a particular type (e.g., voice, data, streaming video, etc.), and/or another measure of a number of users.

Carrier load ratios may be monitored (block 830). For example, service quality monitor 410 may monitor carrier ratios associated with macro cell 110. As another example, service quality monitor 510 may monitor carrier ratios associated with small cell 120. A carrier ratio may correspond to a ratio of the number of users of a particular Quality of Service (QoS) to a total number of users, a ratio of the number of users of a particular QoS to a total capacity of number of users of the particular QoS, and/or another type of carrier load ratio.

Resources in reserve may be monitored (block 840). For example, service quality monitor 410 may monitor resources in reserve associated with macro cell 110. As another example, service quality monitor 510 may monitor resources in reserve associated with small cell 120. Information relating to resources in reserve may include information relating to what percentage of total capacity is available for a particular measure of capacity, such as bandwidth, number of users, processor computing time, memory, and/or another measure of capacity.

A service quality may be determined based on the monitored information (block 850). For example, service quality monitor 410 may determine a service quality score for macro cell 110. As another example, service quality monitor 510 may determine a service quality score for small cell 120. A service quality score may be computed as a weighted average of a score based on a determine RF link quality, a score based on the determined number of users, a score based on a carrier load ratio, and/or a score based on the determined resources in reserve.

Figure 9:
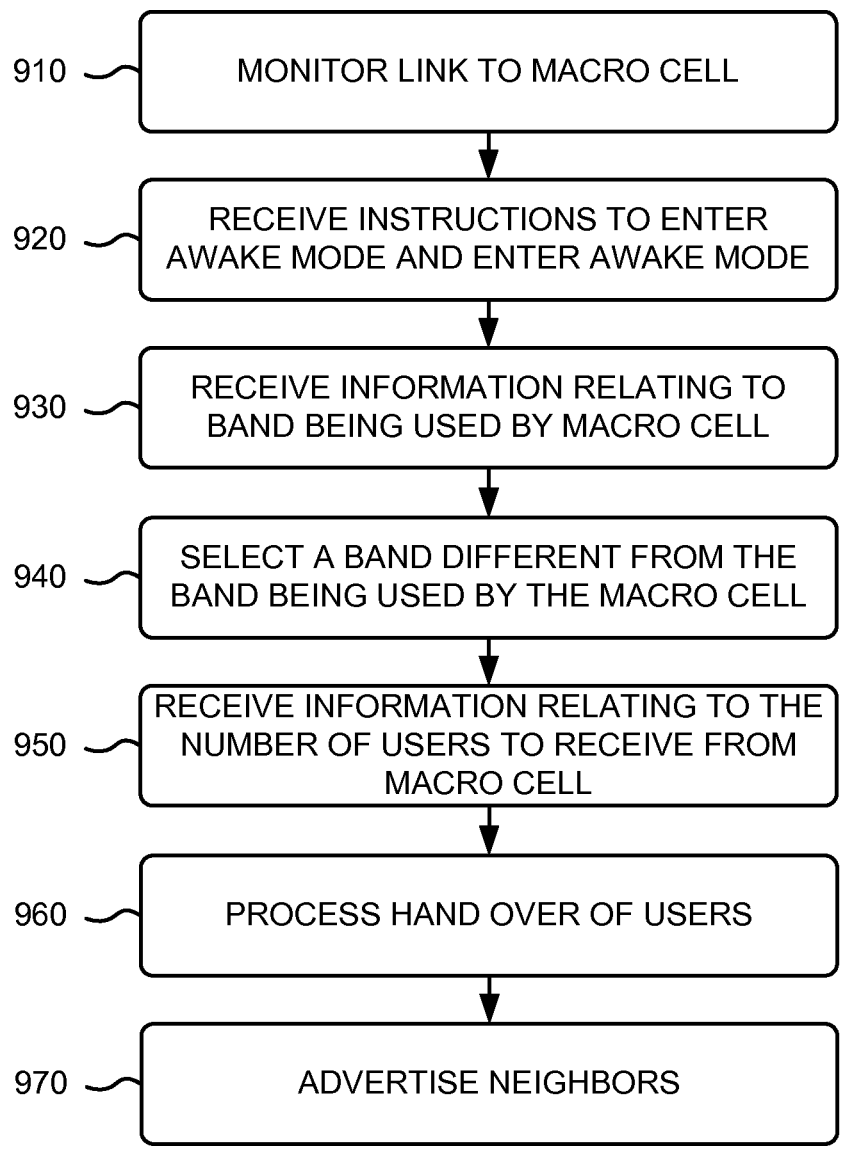
FIG. 9 is a second flowchart of dynamic small cell provisioning according to an implementation described herein.

FIG. 9 is a second flowchart of dynamic small cell provisioning according to an implementation described herein. In one implementation, the process of FIG. 9 may be performed by small cell 120. In other implementations, some or all of the process of FIG. 9 may be performed by another device or a group of devices separate from and/or including small cell 120.

The process of FIG. 9 may include monitoring a link to a macro cell (block 910) and receiving instructions to enter an awake mode (block 920). For example, small cell 120 may be in a sleep mode and may monitor X2 interface 222, and/or S1 interface 225, associated with macro cell 110. Small cell 120 may receive instructions from macro cell 110, via X2 interface 222, or via S1 interface 225 by way of MME 230, to enter an awake mode. In response, small cell 120 may switch from a sleep mode to an awake mode. For example, small cell 120 may increase power to an operating power, may bring one or more transceivers online, may activate one or more processors, and/or may perform other actions to switch from a sleep mode to an awake mode.

Information relating to band being used by the macro cell may be received (block 930) and a band different from the band being used by the macro cell may be selected (block 940). For example, small cell 120 may receive information identifying a particular frequency band being used by macro cell 110 and may select to use a different frequency band. Small cell 120 may be configured to operate in multiple LTE frequency bands, such as the AWS band, the 700C band, the PCS band, the Cellular 850 band, and/or another LTE frequency band. Small cell 120 may store a sequence of bands that should be selected based on preference and may select a next frequency band from the sequence after the frequency band being used by macro cell 110. Thus for example, if the most preferred band is the 700C band and the second most preferred band is the AWS band, and if macro cell 110 is using the 700C band, small cell 120 may select the AWS band.

Information relating to the number of users to be handed over may be received (block 950) and hand over of users may be processed (block 960). For example, macro cell 110 may send information relating to the number of users that are to be handed over to small cell 110 and small cell 110 may provision resources to handle the hand overs. Macro cell 110 may proceed to hand over UEs 140 to small cell 120 and small cell 120 may process the hand overs so that the UEs 140 end up attached to small cell 120.

Neighbors may be advertised (block 970). For example, small cell 120 may store a list of neighboring base stations, which may include other small cells 120 in the area. Small cell 120 may begin to advertise its neighbors to enable UEs 140 in small cell coverage area 125 to select a base station with the best connection (e.g., strongest signal).

Figure 10:
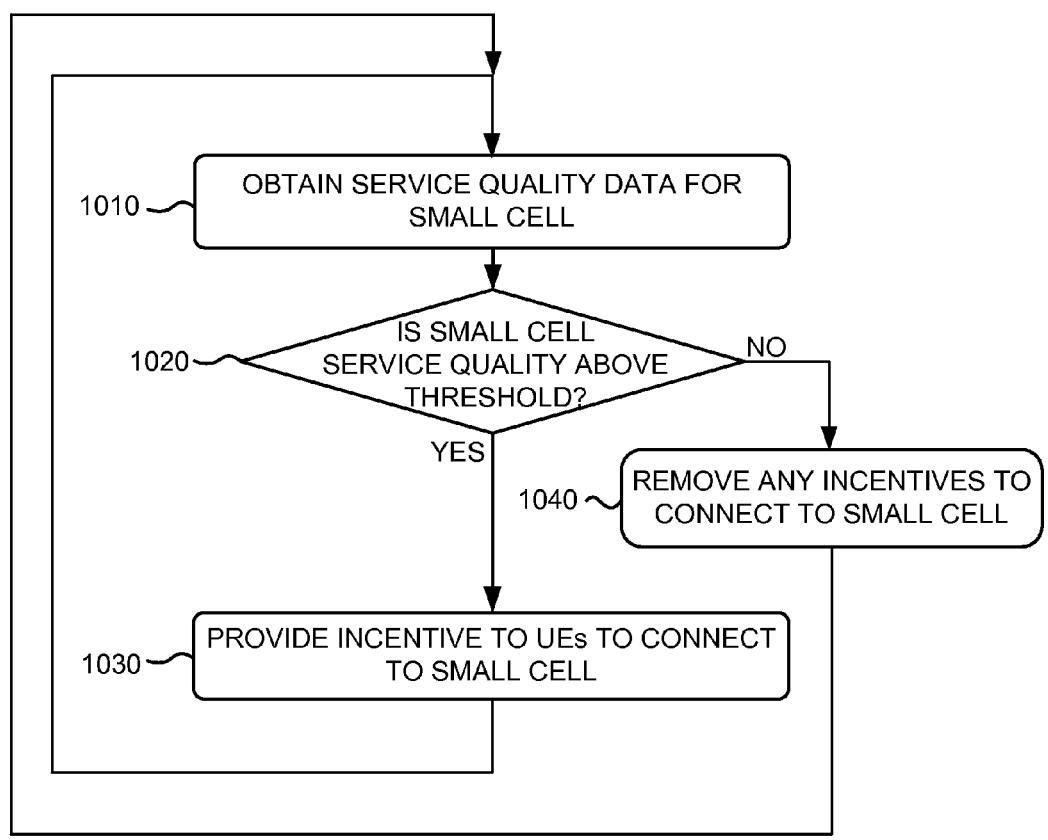
FIG. 10 is a third flowchart of dynamic small cell provisioning according to an implementation described herein.

FIG. 10 is a third flowchart of dynamic small cell provisioning according to an implementation described herein. In one implementation, the process of FIG. 10 may be performed by macro cell 110. In other implementations, some or all of the process of FIG. 10 may be performed by another device or a group of devices separate from and/or including macro cell 110.

The process of FIG. 10 may include obtaining service quality data for a small cell (block 1010). For example, small cell 120 may report, at particular intervals, service quality data determined and stored service quality DB 520 to macro cell 110. Small cell controller 430 of macro cell 110 may store the received service quality data in service statistics field 656 of small cell DB 440.

A determination may be made as to whether the small cell service quality is above a threshold (block 1020). For example, small cell controller 430 may determine a service quality score stored in service statistics field 656 associated with the most recent time period and may determine whether the service quality score is greater than a small cell service quality threshold (e.g., stored in small cell service quality threshold field 662).

If it is determined that the small cell service quality is above the threshold (block 1020—YES), an incentive may be provided to UEs to connect to the small cell (block 1030). As an example, macro cell 110 may reduce its transmission power, which may cause UEs 140 to perceive signals from macro cell 110 as lower quality signals than signals from small cell 120 and may cause UEs 140 to attach to small cell 120. As another example, macro cell 110 may instruct small cell 120 to introduce a bias by increasing its transmission power, which may cause UEs 140 to perceive small cell 120 as providing a better connection and may cause UEs 140 to attach to small cell 120.

If it is determined that the small cell service quality is not above the threshold (block 1020—NO), any incentives to connect to the small cell may be removed (block 1040). For example, macro cell 110 may stop reducing its transmission power or may instruct small cell 120 to eliminate any bias introduced in the transmission power of small cell 120.

Figure 11:
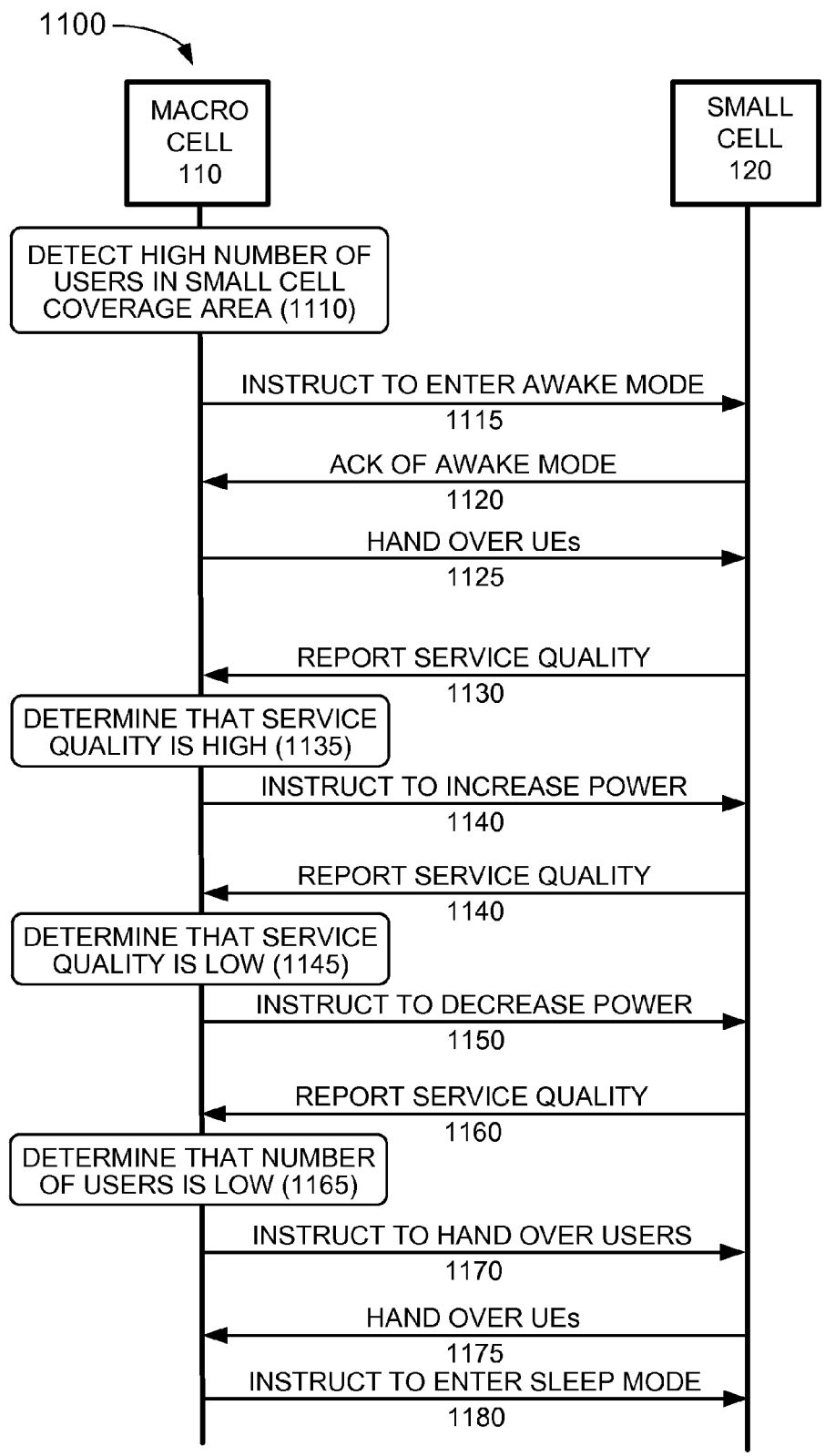
FIG. 11 is a diagram of an exemplary signal flow scenario according to an implementation described herein.

FIG. 11 is a diagram of an exemplary signal flow scenario 1100 according to an implementation described herein. Assume macro cell 110 is associated with small cell 120, which is installed in the vicinity of a shopping mall. When the shopping mall is closed, the number of UEs 140 in the coverage area of small cell 120 may be small and small cell 120 may be in a sleep mode. Thus, any UEs 140 in the area may attach to macro cell 110. After the shopping mall opens, macro cell 110 may begin to detect a high number of users in the small cell coverage area (signal 1110). In response, macro cell 110 may instruct small cell 120 to enter an awake mode (signal 1115). Small cell 120 may acknowledge that it has entered the awake mode (signal 1120) and macro cell 110 may hand over UEs 140 to small cell 120 (signal 1125).

Small cell 120 may, at particular intervals, report service quality statistics to macro cell 110. Small cell 120 may experience high service quality (e.g., strong RF signals, high resources in reserve, low load ratios, etc.) and may report the high service quality to macro cell 110 (signal 1130). Macro cell 110 may determine that the small cell service statistics are higher than a small cell service quality threshold (signal 1135) and may instruct small cell 120 to increase power in order to provide an incentive for UEs 140 to attach to small cell 120 (1140). At a later time, small cell 120 may report a drop in service quality (e.g., low resources in reserve) to macro cell 110 (signal 1150) and macro cell 110 may determine that the small cell service statistics are lower than a small cell service quality threshold (signal 1145). In response, macro cell 110 may instruct small cell 120 to decrease power to remove the incentive for UEs 140 that was previously provided by increasing the transmission power of small cell 120.

After the shopping mall closes, the number of users in the coverage area of small cell 120 may drop to a low number. Small cell 120 may report service quality statistics that include a small number of users (signal 1160). Macro cell 110 may determine that the number of users is below a user threshold (signal 1165) and may select to put small cell 120 to sleep, since running small cell 120 with a small number of users may not be efficient. Macro cell 110 may instruct small cell 120 to hand over all UEs 140 attached to small cell 120 (signal 1175) and may instruct small cell 120 to enter sleep mode (block 1180).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 7-10, and a series of signals have been described with respect to FIG. 11, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a macro cell base station, the method comprising:
    determining, by the macro cell base station, a service quality associated with the macro cell base station;
    determining, by the macro cell base station, whether the service quality is below a quality threshold;
    instructing, by the macro cell base station, a small cell base station to enter an awake mode, in response to determining that the service quality is below the quality threshold, wherein the small cell base station is configured to offload traffic within a coverage area of the macro cell base station;
    determining, by the macro cell base station, that the small cell base station has entered the awake mode; and
    handing over, by the macro cell base station, one or more user equipment devices from the macro cell base station to the small cell base station, in response to determining that the small cell base station has entered the awake mode.

2. The method of claim 1, wherein determining the service quality includes:
    determining a number of user equipment devices connected to the macro cell base station.

3. The method of claim 1, wherein determining the service quality includes:
    determining a load ratio for a frequency band being used by the macro cell base station.

4. The method of claim 1, wherein determining the service quality includes:
    determining a number of resources in reserve associated with the macro cell base station.

5. The method of claim 1, wherein instructing the small cell base station to enter an awake mode includes:
    informing the small cell base station as to how many user equipment devices are to be handed over from the macro cell base station to the small cell base station.

6. The method of claim 1, wherein instructing the small cell base station to enter an awake mode includes:
    sending instructions to the small cell base station over an X2 interface.

7. The method of claim 1, wherein the small cell base station is associated with a different mobility management entity than the macro cell base station, and wherein instructing the small cell base station to enter an awake mode includes:
    sending instructions to the small cell base station over an S1 interface.

8. The method of claim 1, further comprising:
    providing information to the small cell base station identifying a frequency band that the macro cell base station is using; and
    instructing the small cell base station to select a different frequency band than the identified frequency band.

9. The method of claim 1, further comprising:
    receiving an indication from the small cell base station that the small cell base station is associated with a small cell service quality greater than a small cell quality threshold; and
    providing an incentive for user equipment devices in the coverage area of the macro cell base station to attach to the small cell base station.

10. The method of claim 9, wherein providing the incentive for user equipment devices in the coverage area of the macro cell base station to attach to the small cell base station includes:
    reducing an operating power associated with the macro cell base station.

11. The method of claim 9, wherein providing the incentive for user equipment devices in the coverage area of the macro cell base station to attach to the small cell base station includes:
    instructing the small cell base station to increase transmission power.

12. The method of claim 1, further comprising:
    determining that the small cell base station is associated with a small cell service quality that is less than a minimum small cell quality threshold; and
    instructing the small cell base station to enter a sleep mode, in response to determining that the small cell base station is associated with a small cell service quality that is less than a minimum small cell quality threshold.

13. The method of claim 1, further comprising:
    determining that the small cell base station is associated with a number of users less than a user number threshold; and
    instructing the small cell base station to enter a sleep mode, in response to determining that the small cell base station is associated with a number of users less than a user number threshold.

14. A system comprising:
    a macro cell base station configured to:
        determine a service quality associated with the macro cell base station;
        determine whether the service quality is below a quality threshold; and
        instruct a small cell base station to enter an awake mode, in response to determining that the service quality is below the quality threshold; and
    at least one small cell base station, located within a coverage area of the macro cell base station, configured to:
        enter an awake mode, in response to being instructed to enter the awake mode by the macro cell base station; and
        inform the macro cell base station that the small cell base station is in the awake mode; and
    wherein the macro cell base station is further configured to hand over one or more user devices to the small cell base station, when the small cell base station is in awake mode.

15. The system of claim 14, wherein when the macro cell base station is determining a service quality associated with the macro cell base station, the macro cell base station is further configured to:
- determine a number of user equipment devices connected to the macro cell base station;
- determine a load ratio for a frequency band being used by the macro cell base station; or
- determine a number of resources in reserve associated with the macro cell base station.

16. The system of claim 14, wherein the macro cell base station is further configured to:
- hand over a particular number of user equipment devices to the small cell base station;
- determine whether the service quality is still below the quality threshold after handing over the particular number of user equipment devices to the small cell base station; and
- handing over another particular number of user equipment devices to the small cell base station, in response to determining that the service quality is still below the quality threshold after handing over the particular number of user equipment devices to the small cell base station.

17. The system of claim 14, wherein the macro cell base station is further configured to:
- provide information to the small cell base station identifying a frequency band that the macro cell base station is using; and
- wherein the small cell base station is further configured to:
- select a different frequency band than the identified frequency band for the handed over one or more user devices.

18. The system of claim 14, wherein the small cell base station is further configured to:
- determine a small cell service quality associated with the small cell base station;
- determine that the small cell service quality is greater than a small cell quality threshold; and
- provide an indication to the macro cell base station that the small cell service quality is greater than a small cell quality threshold; and
- wherein the macro cell base station is further configured to:
- provide an incentive for user equipment devices in the coverage area of the macro cell base station to attach to the small cell base station, when the small cell service quality is greater than a small cell quality threshold.

19. The system of claim 14, wherein the macro cell base station is further configured to:
- determine that the small cell base station is at least one of associated with a small cell service quality that is less than a minimum small cell quality threshold or associated with a number of users less than a user number threshold; and
- instructing the small cell base station to enter a sleep mode, in response to determining that the small cell base station is at least one of associated with a small cell service quality that is less than a minimum small cell quality threshold or associated with a number of users less than a user number threshold.

20. One or more non-transitory computer-readable media, storing instructions executable by one or more processors, the one or more non-transitory computer-readable media comprising:
- one or more instructions to determine a service quality associated with the macro cell base station;
- one or more instructions to determine whether the service quality is below a quality threshold;
- one or more instructions to instruct a small cell base station to enter an awake mode, in response to determining that the service quality is below the quality threshold, wherein the small cell base station is configured to offload traffic within a coverage area of the macro cell base station;
- one or more instructions to determine that the small cell base station has entered the awake mode;
- one or more instructions to provide information to the small cell base station identifying a frequency band that the macro cell base station is using;
- one or more instructions to instruct the small cell base station to select a different frequency band than the identified frequency band; and
- one or more instructions to hand over one or more user equipment devices from the macro cell base station to the small cell base station, in response to determining that the small cell base station has entered the awake mode.

* * * * *